United States Patent [19]
Geffroy et al.

[11] Patent Number: 4,563,567
[45] Date of Patent: Jan. 7, 1986

[54] APPARATUS FOR TRANSMITTING A LASER BEAM

[75] Inventors: Jean Geffroy, Versailles; Michel Hofman, Epinay sur Orge; Maurice Moulin, Palaiseau; Jean-Paul Noël, Chatenay Malabry, all of France

[73] Assignee: Commissariat a l'Energie Atomique, Paris, France

[21] Appl. No.: 502,214

[22] Filed: Jun. 8, 1983

[30] Foreign Application Priority Data

Jun. 8, 1982 [FR] France ................. 82 09973

[51] Int. Cl.[4] ............................. B23K 26/02
[52] U.S. Cl. ................. 219/121 LU; 219/121 LV; 219/121 FS; 901/15
[58] Field of Search ............... 219/121 LU, 121 LV, 219/121 LW, 121 LX, 121 LY, 121 LC, 121 LD, 121 LH, 121 LJ, 121 L, 121 LM; 901/15, 27, 47; 414/735, 917

[56] References Cited

U.S. PATENT DOCUMENTS

| | | | |
|---|---|---|---|
| 3,226,833 | 1/1966 | Lemelson | 901/47 X |
| 3,369,101 | 2/1968 | DiCurcio | 219/121 LH |
| 3,528,424 | 9/1970 | Ayres | 128/303.1 |
| 4,364,535 | 12/1982 | Itoh et al. | 901/15 X |
| 4,413,180 | 11/1983 | Libby | 350/6.9 |

FOREIGN PATENT DOCUMENTS

| | | | |
|---|---|---|---|
| 2158921 | 5/1973 | France | |
| 0100523 | 7/1980 | Japan | 219/121 FS |
| 1215714 | 12/1970 | United Kingdom | |

OTHER PUBLICATIONS

A. D. Beach, *Journal of Scientific Instruments (Journal of Physics E)* "A Laser Manipulator for Surgical Use", Series 2, vol. 2, pp. 931, 932, 1969.

*Primary Examiner*—C. L. Albritton
*Attorney, Agent, or Firm*—Kerkam, Stowell, Kondracki & Clarke

[57] ABSTRACT

Apparatus for transmitting a beam of energy includes a first arm formed by a hollow tube, which is rotatable about its own axis, a second arm formed by two half-arms, arranged symmetrically with respect to the axis of the first tube and movable with respect thereto by means of an articulation, and a third arm formed by a hollow tube, articulated to the half-arms by two intermediate parts.

9 Claims, 3 Drawing Figures

APPARATUS FOR TRANSMITTING A LASER BEAM

BACKGROUND OF THE INVENTION

The present invention relates to an apparatus for transmitting an energetic beam, and more particularly a laser beam, which not only makes it possible to bring said beam on to any point of a member on which working is taking place, but also into all points of a cell within which said apparatus is located whilst, if desired, giving thereto a random inclination with respect to the member being worked. More specifically, the invention makes it possible to bring a laser beam into any point located within a spherical zone, whose radius is equal to the length of the apparatus.

Several apparatus types exist, which make it possible to transmit a laser beam to several points. For example, certain of these apparatus make it possible to bring and focus a fixed beam on to a table performing two horizontal movements in perpendicular directions, the table or apparatus making it possible to focus the beam performing a vertical movement.

Other apparatus combine rotational movements, e.g. the rotation of the mirror reflecting the beam and the rotation of the member on which working is taking place. This latter apparatus is more particularly used in the welding of circular parts.

Other systems use hollow cylindrical arms connected by articulations, having mirrors which can deflect the beam. Such a system is described in British Pat. No. 1 215 714, which relates to an apparatus making it possible to deflect a laser beam, by means of one or more mirrors, and to focus it on to the part being worked. One of the variants uses an articulation making it possible to connect two tubes in which the beam is propagated. The end of each of the tubes is curved at right angles and has a mirror inclined by 45° relative to the optical axis of the beam. At the junction of the two tubes, there is a ball-bearing system enabling one of these to perform a rotary movement with respect to the other, the rotation axis coinciding with the optical axis of that part of the laser beam located between these two mirrors.

U.S. Pat. No. 3,528,424 describes an apparatus which can be used in surgery and which has a plurality of arms articulated relative to one another and along which passes a laser beam used for cauterizing wounds.

Although all these systems make it possible to deflect a laser beam, they still have a certain number of disadvantages. Thus, in the case of British Pat. No. 1 215 714, the possibilities of movements are limited and they do not make it possible to reach all points of the volume contained in a sphere, within which is positioned the apparatus. Moreover, in the case of British Pat. No. 1 215 714, the positioning of the articulation between two tubes is liable to bring about an overhang, which could cause deformations of one of the tubes and the optical axis of the laser beam would not then coincide with the geometrical axis of the tube. This defect also occurs with the system described in U.S. Pat. No. 3,528,424 and does not permit a robotization of the apparatus.

SUMMARY OF THE INVENTION

The present invention aims at obviating these disadvantages, by proposing an apparatus which makes it possible, on the basis of a fixed laser beam, to deflect the latter, whilst having the possibility of reaching all the points of the volume contained in a sphere, in which is located the apparatus and which obviates possible overhangs with respect to the articulations.

This apparatus has five to six degrees of freedom, whilst the working part can have a random geometry, e.g. planar, cylindrical, rectangular or spherical and can remain fixed in the cell. It serves no useful purpose to provide for a movement of said part in accordance with one or two degrees of freedom.

Thus, according to the main feature of the invention, the apparatus comprises:

a first arm formed by a hollow tube rotating about the axis of the entrance beam and containing a mirror forming an angle of 45° with said beam axis, a second arm formed from two half-arms of the same weight, whereof one is hollow and carries the beam, said second arm being articulated to the tube by means of two intermediate parts, whereof at least one is hollow and contains a mirror forming an angle of 45° with the beam axis, and a third arm formed by a hollow tube, articulated to the second arm by two intermediate members, whereof at least one is hollow and contains a mirror forming an angle of 45° with the beam axis.

This arrangement of the apparatus is particularly suitable for its use for machining by a laser beam in an active enclosure. Thus, when it is extended to its maximum length, e.g. under the action of gravity, it assumes a clearly defined equilibrium position corresponding to a reduced lateral dimension. When its end is brought to a point in space, the angles formed between the different successive arms are clearly defined. These features, linked with the rigidity due to the existence of a mechanical splitting into two of the second arm, are useful when it is wished to introduce the laser beam transmission apparatus through a circular or tubular opening, made in the active enclosure and are indispensable when robotization of the apparatus is planned.

According to another feature of the apparatus, at least one of the arms, other than the first, can be provided with a balancing counterweight. It is also possible to provide displacement motors on certain articulations and the motors can themselves serve as counterweights.

According to another preferred embodiment, the said articulation comprises:

a hollow intermediate part connected to a tube belonging to one of the arms and containing a first flat mirror forming an angle of 45° with the direction of the beam propagating in the tube, a connecting piece, which can be rotated with respect to the intermediate part about an axis coinciding with the optical axis of the beam reflected by the first mirror, and a second flat mirror fitted within the connecting piece and forming an angle of 45° with the beam reflected by the first mirror.

According to another feature of the apparatus, it comprises a fourth arm of limited length, connected to the third arm by an articulation incorporating an intermediate part, said articulation having at least one mirror forming an angle of 45° with the beam.

The expression "limited length" means that the length of the fourth arm is sufficiently low for its mass to be low compared with that of the complete apparatus, in order that the equilibrium of the assembly is only slightly modified by the addition of this fourth arm.

According to yet another feature of the apparatus according to the invention, it can have a fourth arm formed by two half-arms and connected to the third arm by an articulation and a fifth arm formed by a single piece and connected to the fourth arm by an articulation.

Finally, it is possible to provide a lens or a focusing device, positioned at the entrance of the apparatus (which makes is possible to reduce the length of the arms), as well as a cooling system for the mirrors.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 1:
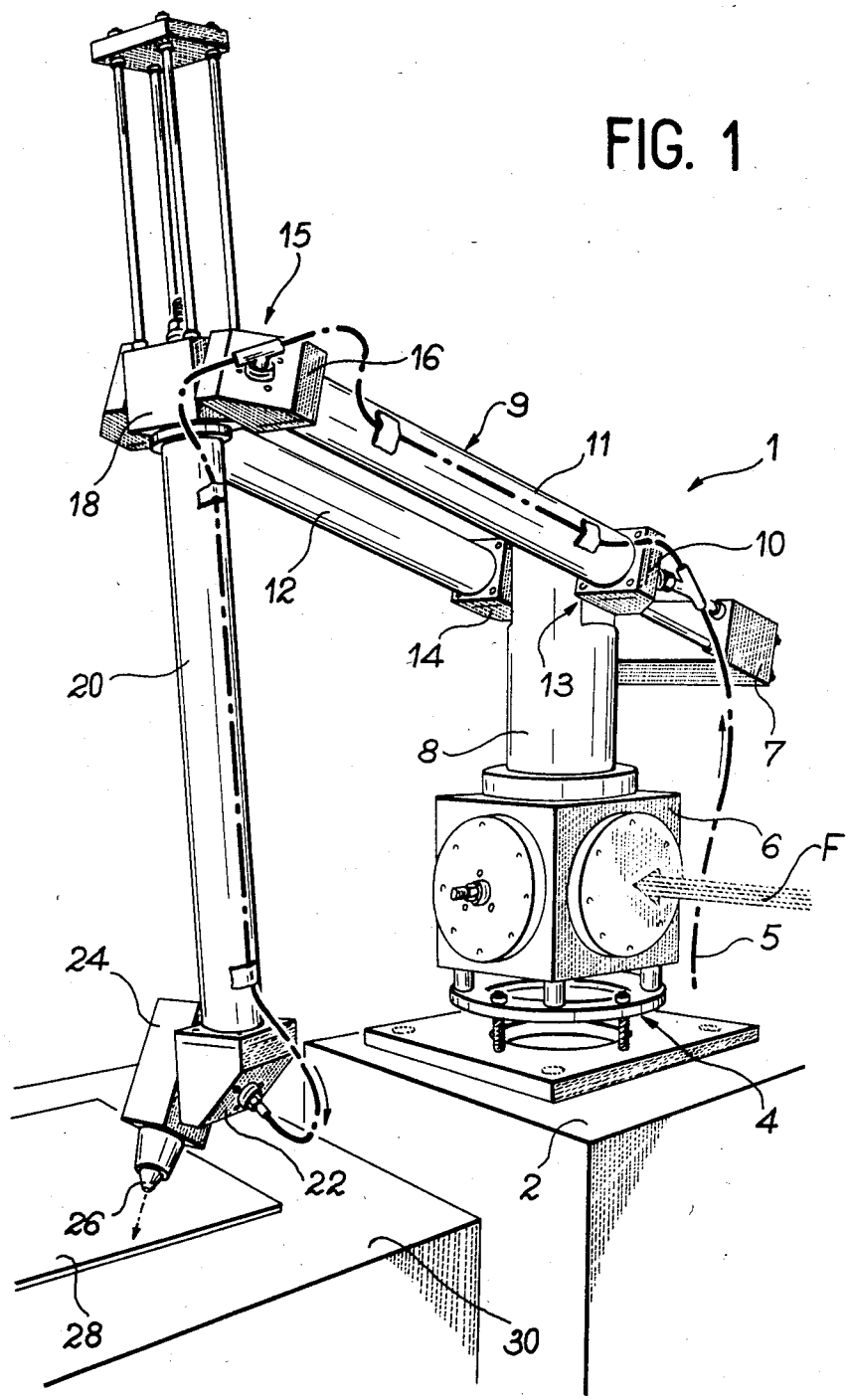
FIG. 1 a diagrammatic perspective view of the complete apparatus according to the invention.

FIG. 1 shows the complete apparatus 1, which is placed on a support 2, via a plate 4. Plate 4 is provided with controls along axes x, y and z. At the bottom of the apparatus, there is a substantially cubic chamber 6, where the laser beam to be transmitted arrives. This beam has a horizontal optical axis and encounters a copper flat mirror, located within chamber 6 and inclined by 45° relative to the direction of the beam, so as to be able to vertically reflect the latter. The position of the mirror is such that the optical axis of the reflected beam coincides with the axis of a vertical cylindrical tube 8, which surmounts chamber 6 and rotates on the mechanical spindle of said chamber. However, it would not pass beyond the scope of the invention to use a configuration in which beam F entered the apparatus in a direction coinciding with the axis of tube 8.

In the upper part of the latter, which forms the first arm of the apparatus, another flat copper mirror, still inclined by 45° relative to the beam, reflects the latter horizontally into an intermediate part 10 connecting tube 8 to a second tube 11, forming part of the second arm of the apparatus and which carries the general reference numeral 9. The intermediate part contains a third flat mirror, which reflects the laser beam along tube 11, and along the axis thereof.

Arm 9 is formed from two parallel cylindrical tubes or half-arms 11, 12, arranged symmetrically relative to the first tube 8. The arrangement of articulation 13 between tube 8 and arm 9 is such that the latter can perform two rotational movements. Firstly, tube 8 is able to move around its axis and the assembly constituted by tube 8 and arm 9 is able to rotate about said axis. In addition, tubes 11 and 12, as well as intermediate parts 10 and 14 connecting them to the tube 8, can pivot about a horizontal axis, which encounters the vertical axis of tube 8. The fact of using for arm 9, two parallel tubes positioned symmetrically with respect to tube 8, makes it possible to obviate overhangs, which would occur in the case where only a single tube 11 was provided. Although the optical axis is displaced relative to the mechanical spindle of the apparatus, this makes it possible to ensure that the working point is constantly in a plane passing through the axis of the entrance laser beam coinciding with the axis of tube 8. The presence of these two tubes 11 and 12 makes it possible to compensate this tendency and maintain arm 9 constantly in a correct position relative to tube 8. Obviously, in this configuration, use is only made of one of the two tubes for the transmission of the beam, the other being used e.g. for the passage of cables, or for carrying a mirror cooling fluid, or for the gases required for machining purposes. Arm 9 is balanced by means of a counterweight 7, whereby the latter can optionally be produced by a motor acting as a counterweight. This arrangement has the advantage of involving the control motors in less work. At the other end of each of the tubes 11 and 12, there is a further articulation 15 making it possible to connect arm 9 to a cylindrical tube 20, which constitutes the third arm of the apparatus.

Articulation 15 firstly has an intermediate part 16 mounted on tube 11 and containing a flat mirror, inclined by 45° relative to the beam axis, which makes it possible to deflect the beam on to a second flat mirror, inclined by 45° relative to the axis of the beam reflected by the first mirror. This second mirror is placed within a connecting piece 18 and tube 20 is connected to the latter in such a way that it can rotate about its axis. Moreover, the assembly constituted by tube 20 and piece 18 moves around a horizontal axis, which remains perpendicular to the axis of tubes 11 and 12, no matter what the position of the latter. Finally, at the lower end of tube 20 there is an intermediate part 22, identical to the intermediate part 16, which makes it possible to reflect the beam on to a final mirror located in a box 24. The latter rotates about an axis coinciding with the optical axis of the beam reflected by the mirror located in intermediate part 22. The beam passes out by a nozzle 26, mounted on box 24, which makes it possible to machine or weld a part, e.g. a metal plate 28 placed on a table 30. Box 24 and nozzle 26 overhang, but this can be accepted on parts having a limited mass.

A variant uses at the end of tube 20, a mechanical combination identical to the configuration of parts 8, 11 and 12, in such a way that the box 24 is in the axis of the apparatus.

Box 24 contains the focusing system, represented here by a mirror, which can be spherical, parabolic, cylindrical or the like. It can use one or more focusing lenses.

However, it is possible to place the focusing lens at another point. If this lens is placed at the entrance to the apparatus, e.g. in chamber 6, its focal length must be equal to the path taken by the beam along the different arms of the apparatus, in order that the focal point is located on the part 26 to be machined. This arrangement reduces the weight of the members located at the end of the arm and also makes it possible to reduce the diameter of the arms from chamber 6 to nozzle 26, and consequently the weight of the different parts from chamber 6 to the end of the arm. Finally, a gas pipe 5, shown diagrammatically in dotted lines in FIG. 1, makes it possible to supply the gas necessary for cooling the mirrors and more specifically the mirrors located in the intermediate parts 10, 16 and 22.

Figure 2:
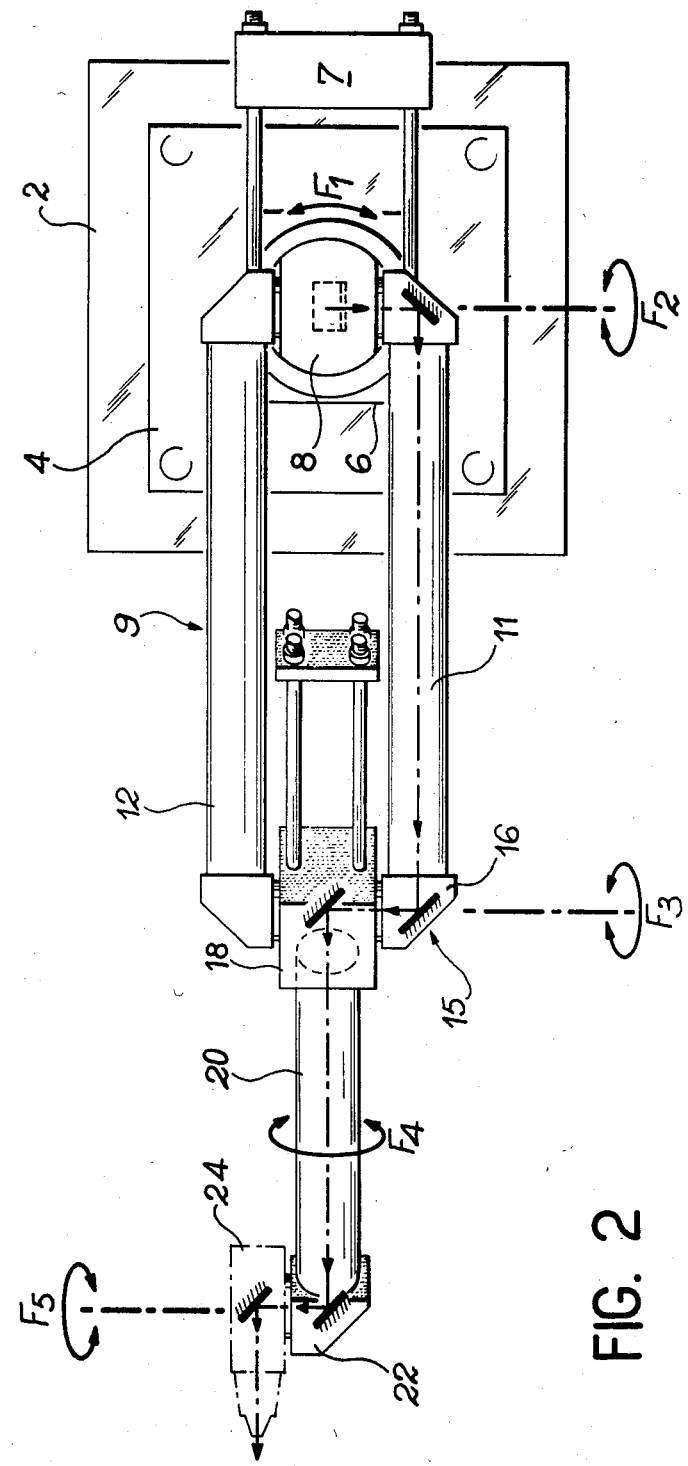
FIG. 2 a plan view of the apparatus of FIG. 1, illustrating all the movements permitted by its configuration.
Figure 3:
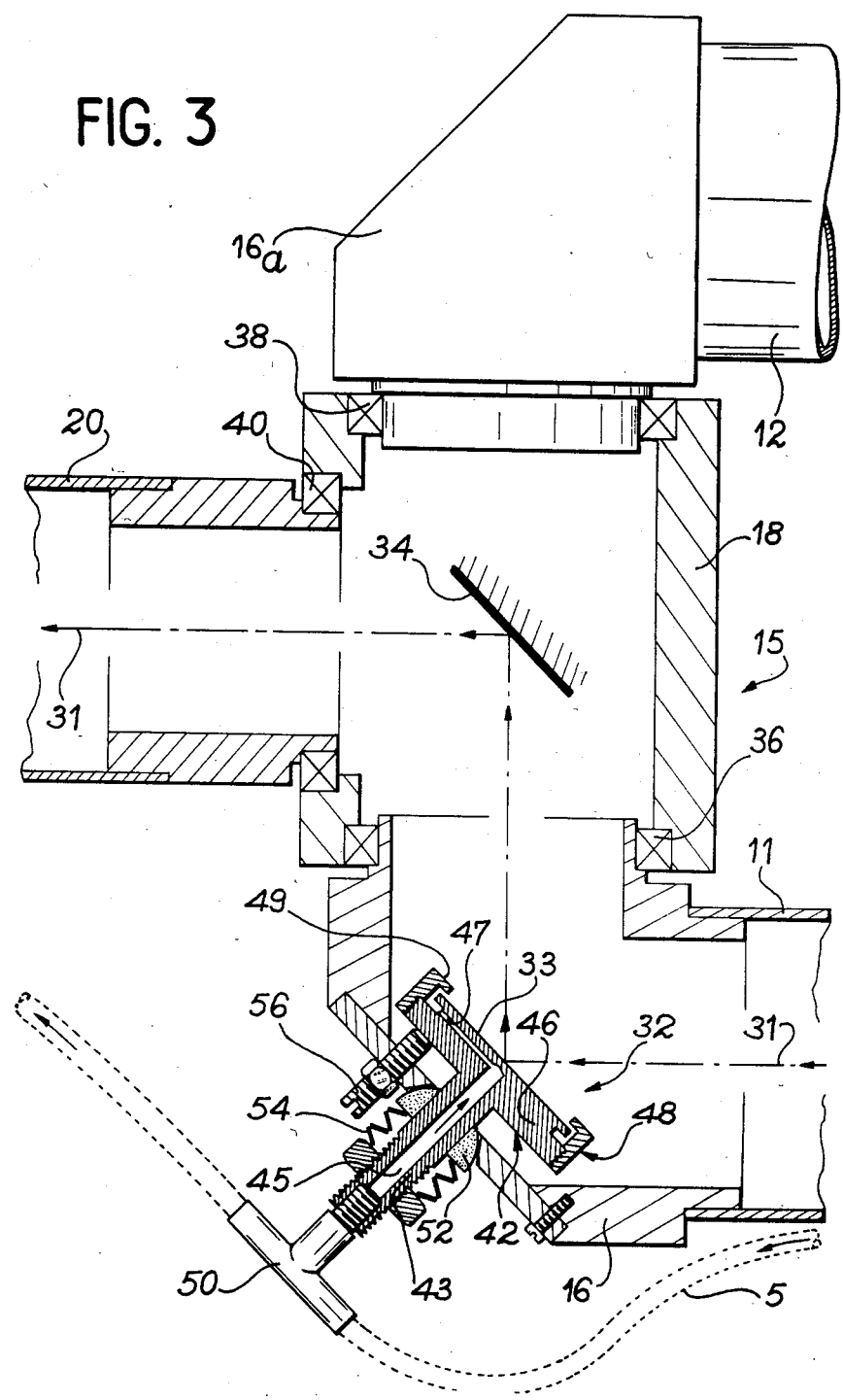
FIG. 3 a diagrammatic sectional view, showing in greater detail one of the articulations of said apparatus.

The plan view of FIG. 2 shows the different rotational movements permitted by the apparatus. It is firstly possible to see the first tube 8, the assembly constituted by this tube and arm 9 being movable around the vertical axis of tube 8 (arrow F1). Furthermore, arm 9 can rotate about a horizontal axis encountering the vertical axis of tube 8 (arrow F2). The articulation 15 between arm 9 and tube 20 also permits two rotational movements. The intermediate part 16 is fixed relative to tube 11, but the assembly constituted by tube 20 and connecting piece 18 moves around an axis coinciding with the optical axis of the beam reflected by the mirror contained in intermediate part 16 (arrow F3). Finally, tube 20 rotates about its axis (arrow F4), which coincides with the optical axis of the beam reflected by the mirror contained in intermediate part 18. Intermediate part 22, located at the opposite end of tube 20 with respect to connecting piece 18, is fixed relative to this tube, but box 24 rotates about an axis coinciding with the axis of the beam reflected by the mirror placed within part 22 (arrow F5). Connecting piece 18 is connected to intermediate part 16, 16a by bearings 36, 38, as shown in FIG. 3 or, in a motorized variant, by a system of gears occupying the same position. Thus, the apparatus according to the invention has five degrees of freedom, and by combining all these rotational movements, it is possible to reach any point in an enclosure, within which is positioned the apparatus, naturally if the total length of the arms is equal to the dimensions of the enclosure.

FIG. 3 shows in greater detail the configuration of articulation 15. FIG. 3 is a sectional plan view corresponding to the case where the tubes 11 and 12 on the one hand and tube 20 on the other have their axes in the same plane. It is possible to see tube 11, in which is propagated the laser beam 31 and the intermediate part 16 fixed to tube 11. Within part 16 is located a copper mirror 32 having a planar face 33, inclined by 45° relative to the axis of beam 31, so as to reflect the latter on to a second mirror 34, located within the connecting piece 18. The latter is still positioned at 45° relative to the axis of the beam reflected by the first mirror 32 and reflects the right-angled beam within tube 20. FIG. 3 also shows the second tube 12 of arm 9 connected to connecting piece 18 by an intermediate part 16a, identical to part 16. Connecting piece 18 is connected to intermediate parts 16, 16a by bearings 36, 38 respectively, which makes it possible for the assembly constituted by connecting piece 18 and tube 20 to pivot about a rotation axis coinciding with the axis of that part of beam 31 located between the two mirrors 32 and 34. Moreover, tube 20 is connected to connecting piece 18 by another bearing 40, which enables the tube 20 to rotate about its axis, which coincides with the optical axis of the beam reflected by mirror 34. Thus, nozzle 26 can be brought into any point of the space contained within a sphere, whose radius is the sum of the lengths of arms 9 and 20 and centred on articulation 13. In addition, it is possible to give nozzle 26 any desired orientation in space.

FIG. 3 also shows the construction of mirror 32 equipping intermediate piece 16. This mirror firstly comprises a first part 42, whereof a first portion 43 is shaped like a cylinder, axially perforated by a pipe 45 and a second portion 46 is shaped like a disk having a circular planar surface 33, the plane of said surface being perpendicular to the axis of the cylindrical portion 43. Pipe 45 is extended, within disk 46, by several pipes 47, which are perpendicular thereto and issue on to the lateral surface of disk 46. A deflector 48 is screwed on to disk 46 and has a turned down edge 49, making it possible to turn the gas leaving pipe 47 on to the planar surface 33 of disk 46. The cooling gas circulating in pipe 5 is introduced into pipe 45 by means of the T-coupling 50. The function of deflector 48 is to turn the gaseous stream arriving by pipes 45 and 47 on to the surface of disk 46, not only to cool the latter, but also to remove any dust which may have been deposited thereon. The drawing shows that the cylindrical portion 43 of mirror 32 issues to the outside of the intermediate part 16, the gas intake pipe 5 being located outside the different parts of the apparatus. Mirror 32 is held in position by means of a ball joint 52, secured by a stack of elastic pieces 54. The position of mirror 32 can be regulated by a screw such as 56, which also issue to the outside of intermediate part 16. For all the mirrors such as 32 or 34, there are three screws 56, which makes it possible to regulate the position of each mirror from outside the apparatus.

In the case of mirror 34, use is made of a securing and cooling device, identical to that of mirror 32, but adapted for fixing to connecting piece 18.

In a variant, the cooling circuit of mirror 34 passes through tube 12, which is not used for the propagation of the laser beam.

The apparatus according to the invention has numerous advantages, but the most important advantage is that on the basis of a fixed laser beam, it is possible to bring the end thereof into all points of a given volume, as a result of the numerous rotations permitted by the articulations connecting the arms of the apparatus. Moreover, through having a structure with two parallel tubes 11 and 12 for the second arm 9 and which are arranged symmetrically with respect to the vertical tube 8, prevents any overhangs and contributes to ensuring the optical axis of the laser beam coincides with the geometrical axis of the tubes or with the rotation axes of the various articulations.

The balance of the different arms can be ensured by counterweights, like counterweight 7, shown in FIG. 1. In a motorized embodiment, where the relative rotations of each of the arms are obtained by means of motors, it is possible to position the control motors in place of the counterweights.

The applications cover all fields in which it is necessary to move an energetic beam into different points of a given volume and more specifically for welding and machining by laser beam in a radioactive cell.

What is claimed is:

1. An apparatus for transmitting a beam of energy said apparatus comprising:
    a first arm comprising a hollow tube having a longitudinal axis, said arm being disposed for rotation about said axis;
    first reflecting means disposed within said tube so as to reflect said beam along said longitudinal axis;
    a second arm comprising a first half arm and a second half arm having the same weight, said half arms being symmetrical of each other with respect to a plane containing the longitudinal axis of said first arm and at least said first half arm being hollow;
    at least one intermediate part connecting said second arm to said first arm so that said second arm may rotate with respect to said first arm about an axis perpendicular to the longitudinal axis of the first arm and encountering the latter;
    second reflecting means for transmitting the beam reflected by said first reflecting means within said first half arm;
    a third arm comprising a hollow tube having a longitudinal axis;
    at least one intermediate member connecting said third arm to said second arm so that said third arm may rotate with respect to said second arm about an axis perpendicular to the longitudinal axis of said third arm; and third reflecting means for deviating the beam circulating within said first half arm so that it coincides with the longitudinal axis of said third arm.

2. An apparatus according to claim , 1 wherein at least one of the arms other than the first arm is equipped with a balancing counterweight.

3. An apparatus according to claim 2, further comprising at least one motor means for displacement of one of the arms with respect to an adjacent arm.

4. An apparatus according to claim 11, wherein the motor means serves as a counterweight.

5. An apparatus according to claim , 1 wherein the tube forming the third arm of the apparatus moves about its axis.

6. An apparatus according to claim 1, further comprising a fourth arm of limited length connected to the third arm by an articulation incorporating an intermediate part, said articulation having at least one mirror forming an angle of 45° with the beam.

7. An apparatus according to claim claim 1, further comprising a fourth arm formed by two half arms and connected to the third arm by an articulation and a fifth arm formed in one piece and connected to the fourth arm by an articulation.

8. An apparatus according to claim , 1 wherein at least one of the mirrors is equipped with a cooling system.

9. A apparatus according to claim 1, further comprising a lens for focusing said energetic beam.

* * * * *

UNITED STATES PATENT AND TRADEMARK OFFICE
CERTIFICATE OF CORRECTION

PATENT NO. : 4,563,567
DATED : January 7, 1986
INVENTOR(S) : Geffroy et al

It is certified that error appears in the above-identified patent and that said Letters Patent is hereby corrected as shown below:

Column 7 line 18 (claim 4, line 1)
"claim 11" should be --claim 3--.

Signed and Sealed this

Fifth Day of August 1986

[SEAL]

Attest:

DONALD J. QUIGG

Attesting Officer

Commissioner of Patents and Trademarks